United States Patent Office 3,378,579
Patented Apr. 16, 1968

3,378,579
URETHANES OF TRIARYLACRYLAMIDES
Robert Edward Allen, Walnut Creek, and Laszlo Ambrus, Berkeley, Calif., assignors to Cutter Laboratories, Inc., Berkeley, Calif., a corporation of Delaware
No Drawing. Filed July 2, 1964, Ser. No. 380,085
15 Claims. (Cl. 260—479)

ABSTRACT OF THE DISCLOSURE

Urethanes of triarylacrylamides wherein at least one of the aryl groups contains a carbamoyloxy substituent. The compounds are characterized by gonadotrophic inhibitory and uterotrophic activity; also by herbicidal and insecticidal activity.

The present invention relates to novel urethane compounds and is more particularly concerned with urethanes of triarylacrylamides, a method for their preparation, compositions incorporating the novel compounds, and a method of treatment utilizing the active compounds of the invention and compositions containing the same.

The novel compounds of the present invention may be represented by the formula:

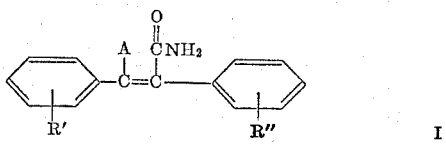
I wherein R' and R'' are independently selected from the group consisting of hydrogen, lower-alkyl, lower-alkoxy, halogen, trifluoromethyl, dilower-alkylamino, hydroxy, and carbamoyloxy

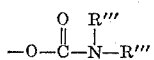

hereinafter written —OCONR'''R''', in which the two R''' groups are independently selected from the group consisting of hydrogen, lower-alkyl, and A, and together with the nitrogen atom may represent piperidino, pyrrolidino, morpholino, piperazino, N-lower-alkylpiperazino, and mono and poly C-lower-alkyl derivatives thereof, and preferably hydrogen, lower-alkyl, and phenyl at least one of R' and R'' being carbamoyloxy and wherein A has the formula

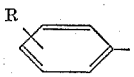

in which R is selected from the group consisting of hydrogen, lower-alkyl, lower-alkoxy, halogen, trifluoromethyl and dilower-alkylamino. The compounds of the invention can exist as cis or trans geometric isomers, and such isomers are within the scope of the invention as well as the isomeric mixtures.

Throughout the specification and claims, the terms lower-alkyl, lower-alkoxy, and dilower-alkylamino refer to the respective groups having up to eight carbon atoms inclusive in each lower-alkyl radical thereof. Such groups having up to a maximum of four carbon atoms in each lower-alkyl radical are preferred.

The compounds of the foregoing formula are characterized by gonadotrophic inhibitory and uterotrophic activity, and are accordingly useful in the treatment of conditions involving fertility and sterility problems in both males and females, especially those conditions arising from or subject to influence by female or male hormonal imbalance. The compounds are also useful as herbicides and insecticides.

The compounds of the invention are prepared by reacting a phenolic hydroxy-containing triphenylacrylamide with an isocyanate, cyanic acid (HNCO), or a carbamyl halide, or with individual components ultimately providing the same groups as a carbamyl halide, for example phosgene and an amine.

The hydroxy-containing triphenylacrylamide starting materials have the following general structure:

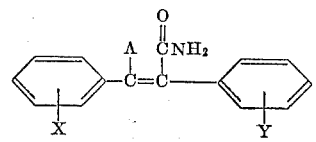
II wherein X and Y are independently selected from the group consisting of hydrogen, lower-alkyl, lower-alkoxy, halogen, trifluoromethyl, dilower-alkylamino, and hydroxy, at least one of X and Y being hydroxy, and wherein A has the value given hereinbefore. This starting material may in some cases also be used in the form of its sodium or other alkali metal or alkaline earth metal salt. Examples 8 and 9 are illustrate of such procedure.

The phenolic intermediates may be conveniently prepared by demethylation of a corresponding methoxy-substituted triphenylacrylonitrile by means of pyridine hydrochloride, preferably at the reflux temperature for pyridine hydrochloride, or by decomposition of a 2-tetrahydropyranyl ether derivative of the phenol by means of an aqueous acid such as dilute hydrochloric or sulfuric acid or the like. The latter method is preferable, particularly when one desires to obtain a phenolic intermediate where another non-phenolic phenyl group carries an alkoxy substituent. The methyl or tetrahydropyranyl ether intermediates are conveniently prepared by the condensation of a suitably substituted benzophenone with an appropriately substituted phenylacetonitrile. The condensation may be effected in inert solvents such as diethylether, benzene, toluene, dimethylformamide, or any combination of these, preferably at their reflux temperatures, using a basic catalyst such as sodium or potassium or lithium amide, hydride, or the metals themselves in a finely divided state in a solvent such as toluene or xylene. The starting phenolic hydroxy-containing triarylacrylamides are then prepared by hydrolysis of the corresponding hydroxy-containing triarylacrylonitriles, which may be conveniently effected by refluxing with a strong base such as sodium or potassium hydroxide in a relatively high boiling alcohol containing water, such as a moist amyl alcohol, for a reaction period which may vary from about one to about ten hours, and acidifying to convert the phenolate to the free phenol, when desired.

The second starting material is selected from the group consisting of (a) R''''—N=C=O, (b)

R'''R''''—N—CO—Cl and (c) a combination of phosgene (COCl₂) and

HNR'''R'''' wherein R''' in (a) is selected from the group consisting of hydrogen, lower-alkyl, and A, and the two R''' groups in (b) and (c) are independently selected from the group consisting of hydrogen, lower-alkyl, and A, in which A has the value given hereinbefore, and together with the N may be pyrrolidino, piperidino, morpholino, piperazino, N-lower-alkylpiperazino, or a mono or poly C-lower-alkyl derivative thereof.

It will be recognized that the combination of reactants (c) provides reactant (b) in situ. When the combination of reactants (c) is used, the starting material (II) is first reacted with phosgene and subsequently with the amine.

When a starting material of Formula II is used in which both X and Y are hydroxy groups, employing an amount of the second starting material less than that required to react completely with both hydroxy groups, only one of the hydroxy groups X and Y reacts and the other appears as R' or R'' in the final product of Formula I. When an excess of the second reactant is employed, both hydroxy groups are converted to carbamate groups.

The end product of the reaction is a primary, secondary, or tertiary urethane, as desired, dependent upon the nature of the second starting material. The basic reactions can be illustrated as follows:

Primary urethanes:

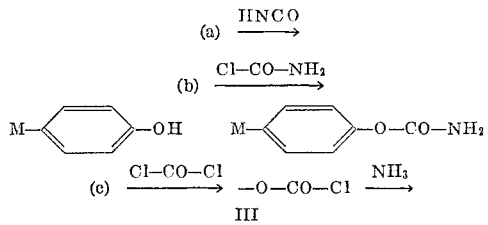

M designating the remainder of the molecule, only the moiety taking part in the reaction being shown in detail.

Secondary urethanes:

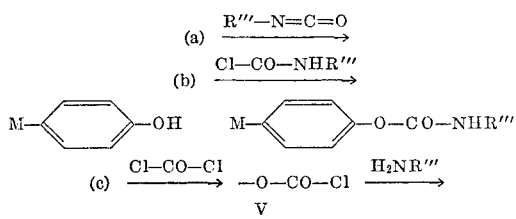

Tertiary urethanes:

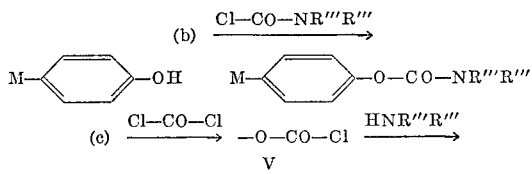

In the formulas given above, the R''' radicals have the values given hereinbefore. The hydroxy group may be in the ortho or meta position rather than para as shown. The chlorine atom may be replaced by other halogen atoms, e.g., bromine. The reaction conditions and procedure are generally conventional. In a preferred embodiment, a lower-alkyl isocyanate in which the lower-alkyl group has up to eight carbon atoms, inclusive, is employed. The reaction is usually carried out in an inert solvent such as benzene, dimethylformamide, ether, or the like, or in a combination of solvents, to which has been added a catalytic amount of a tertiary amine base such as pyridine or triethylamine, and at temperatures ranging from about —20° centigrade to reflux temperatures. The reaction solvent is generally removed under reduced pressure upon completion of the reaction, whereafter the crude product is extracted with a suitable solvent, e.g., benzene, the extract filtered and diluted with a lower-hydrocarbon solvent, e.g., hexane, and the product which crystallizes then recrystallized to a desired state of purity. Other conventional procedures for recovery and purification may be used if desired. Conversion of the triarylacrylonitrile to the triarylacrylamide is by hydrolysis in the manner already indicated.

The starting phenolic hydroxy-containing triarylacrylamides, most of which are new compounds, are prepared as follows:

Preparation 1.—3,3-diphenyl-2-(4-hydroxyphenyl) acrylamide

One hundred ten grams (0.61 mole) of benzophenone and 40 grams (0.9 mole) of sodium hydride dispersion (53 percent in mineral oil) are suspended in 300 milliliters of dry benzene. To this stirred suspension, heated to reflux, is added a solution of 90 grams (0.61 mole) of 4-methoxy-phenylacetonitrile in 200 milliliters of dry benzene over a one-hour period. The reaction mixture is refluxed for four additional hours at the end of which time hydrogen evolution has practically ceased. The reaction mixture is kept at room temperature for sixteen hours and the excess hydride cautiously decomposed with water. The organic layer is washed several times with water, dried over anhydrous magnesium sulfate, filtered, and the solvent removed under reduced pressure. The residue is taken up in a minimum amount of hot ethanol. 3,3-diphenyl-2-(4-methoxyphenyl)-acrylonitrile is obtained as yellow needles melting at about 148–149° centigrade.

Ninety grams (0.29 mole) of 3,3-diphenyl-2-(4-methoxyphenyl)acrylonitrile and 126 grams (1.1 moles) of pyridine hydrochloride are refluxed for thirty minutes. The reaction mixture is cooled and diluted with water. The crude material is filtered and dissolved in one liter of five percent warm sodium hydroxide solution, the solution is filtered, and the filtrate is acidified with one liter of five percent hydrochloric acid. The precipitate is filtered and dissolved in a minimum amount of hot ethanol. 3,3-diphenyl-2-(4-hydroxyphenyl)acrylonitrile is obtained as yellow crystals melting at about 229–230° centigrade.

*Analysis.*—Calculated for $C_{21}H_{15}NO$: C, 84.80; H, 5.08; N, 4.71. Found: C, 85.00; H, 4.61; N, 4.57.

This compound can also be obtained by acid decomposition of 3,3 - diphenyl-2 - [4 - tetrahydropyran-2-yloxy) phenyl]-acrylonitrile which is prepared by the condensation of benzophenone with 4-(tetrahydropyran-2-yloxy) phenylacetonitrile (procedure of Preparation 3) to give 3,3 - diphenyl - 2 - [4-(tetrahydropyran-2-yloxy)phenyl] acrylonitrile, melting at about 143–144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 81.60; H, 6.08; N, 3.69.

A mixture of 29.7 grams (0.10 mole) of 3,3-diphenyl-2-(4-hydroxyphenyl)acrylonitrile and 120 grams (3.0 moles of sodium hydroxide in 400 grams of isoamyl alcohol is refluxed for three hours. The mixture is cooled, a solid separates and is collected on a filter, dissolved in about 500 milliliters of warm water and re-precipitated by diluting with excess ten percent hydrochloric acid. The collected precipitate is washed with water and crystallized from a minimum of hot (100° centigrade) acetic acid to give white needles of 3,3-diphenyl-2-(4-hydroxyphenyl)acrylamide, melting at about 284–285° centigrade.

*Analysis.*—Calculated for $C_{21}H_{17}NO_2$: C, 80.00; H, 5.43; N, 4.44. Found: C, 79.72; H, 5.55; N, 4.55.

Preparation 2.—2-(4-hydroxyphenyl)-3,3-bis(4-tolyl)-acrylamide

By the procedure described in Preparation 1, 4,4'-dimethylbenzophenone is allowed to react with 4-methoxyphenylacetonitrile to give 2-(4-methoxyphenyl)-3,3-bis (4-tolyl)acrylonitrile, yellow crystals when crystallized from isopropanol, melting at about 146–148° centigrade.

*Analysis.*—Calculated for $C_{24}H_{21}NO$: C, 84.95; H, 6.23; N, 4.12. Found: C, 84.52; H, 6.76; N, 3.91.

By treating 2-(4-methoxyphenyl)-3,3-bis(4-tolyl)-acrylonitrile with pyridine hydrochloride according to the procedure of Preparation 1, 2-(4-hydroxyphenyl)-3,3-bis (4-tolyl)acrylonitrile is obtained as yellow crystals melting at about 229–230° centigrade.

*Analysis.*—Calculated for $C_{23}H_{19}NO$: C, 84.90; H, 5.88; N, 4.31. Found: C, 84.74; H, 5.69; N, 4.70.

By the procedure described in Preparation 1, a mixture of 2-(4-hydroxyphenyl)-3,3-bis(4-tolyl)acrylonitrile and sodium hydroxide in isoamyl alcohol is refluxed for about three hours, cooled, and the product filtered, converted to the phenol by acidification, and recrystallized, to give white needles of 2-(4-hydroxyphenyl)-3,3-bis(4-tolyl)-acrylamide, melting at about 254–255° centigrade.

*Analysis.*—Calculated for $C_{23}H_{21}NO_2$: C, 80.44; H, 6.16; N, 4.08. Found: C, 80.23; H, 6.11; N, 4.15.

Preparation 3.—2-(4-hydroxyphenyl)-3,3-bis(4-methoxyphenyl)-acrylamide

A mixture of 160 grams (1.2 moles) of 4-hydroxyphenyl-acetonitrile and 103 grams (1.3 moles) of dihydropyran is dissolved in 500 milliliters of dry benzene and two milliliters of concentrated hydrochloric acid added. The reaction mixture is refluxed for four hours and kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure. The oily residue is crystallized from an ether-pentane (1 to 3) mixture to give 4-(tetrahydropyran-2-yloxy)phenylacetonitrile, yellow crystals melting at about 64–66° centigrade.

To a refluxing suspension of 70 grams (1.8 moles) of sodium amide and 150 milliliters of benzene is added a solution of 154 grams (0.72 mole) of 4-(tetrahydropyran-2-yloxy)phenylacetonitrile in 500 milliliters of dry benzene over a three-hour period. The reaction mixture is refluxed for one additional hour at the end of which time the ammonia evolution has practically ceased. With stirring, a hot solution of 174 grams (0.72 mole) of 4,4'-dimethoxybenzophenone in two liters of benzene is added. After two additional hours at reflux, the reaction mixture is kept at room temperature for sixteen hours and the excess sodium amide is cautiously decomposed with water. The organic layer is washed several times with water, dried over anhydrous magnesium sulfate, filtered, and the solvent removed under reduced pressure. The oily residue is triturated with a warm mixture of one liter ethanol and 500 milliliters of petroleum ether (B.P. 60–68° centigrade) from which a yellow solid, melting at about 202–206° centigrade, is obtained by evaporation. This solid is dissolved in 500 milliliters of boiling glacial acetic acid containing three drops of concentrated sulfuric acid and slowly diluted with water until yellow needles separate (about 800 milliliters of water is needed). 2-(4-hydroxyphenyl)-3,3-bis(4-methoxyphenyl)acrylonitrile is obtained as yellow crystals melting at about 217–219° centigrade.

*Analysis.*—Calculated for $C_{23}H_{19}NO_3$: C, 77.29; H, 5.36; N, 3.92. Found: C, 77.38; H, 5.34; N, 3.81.

By the procedure described in Preparation 1, a mixture of 2-(4-hydroxyphenyl)-3,3-bis(4-methoxyphenyl)acrylonitrile and sodium hydroxide in isoamyl alcohol is refluxed for about three hours, cooled, and the product filtered, converted to the phenol by acidification, and recrystallized, to give 2-(4-hydroxyphenyl)-3,3-bis(4-methoxyphenyl)acrylamide.

Preparation 4.—3,3-bis(4-chlorophenyl)-2-(4-hydroxyphenyl)-acrylamide

By the procedure described in Preparation 3, 4,4'-dichlorobenzophenone is allowed to react with 4-(tetrahydropyran-2-yloxy)phenylacetonitrile to give 3,3-bis(4-chlorophenyl)-2-(4-hydroxyphenyl)acrylonitrile, yellow crystals when crystallized from acetic acid, melting at about 252–254° centigrade.

*Analysis.*—Calculated for $C_{21}H_{13}Cl_2NO$: C, 68.88; H, 3.58; N, 3.82. Found: C, 68.80; H, 3.58; N, 3.85.

By the procedure described in Preparation 1, a mixture of 3,3-bis(4-chlorophenyl)-2-(4-hydroxyphenyl)acrylonitrile and sodium hydroxide in isoamyl alcohol is refluxed for about three hours, cooled, and the product filtered, converted to the phenol by acidification, and recrystallized, to give 3,3-bis(4-chlorophenyl)-2-(4-hydroxyphenyl)acrylamide.

Preparation 5.—2,3-diphenyl-3-(4-hydroxyphenyl) acrylamide

A mixture of 100 grams (0.505 mole) of 4-hydroxybenzophenone and 50 grams (0.595 mole) of dihydropyran is dissolved in 500 milliliters of warm dry benzene and two milliliters of concentrated hydrochloric acid is added. The reaction mixture is refluxed for four hours and then kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure to give a yellow oil, which is dissolved in pentane to give white crystals of 4-(tetrahydropyran-2-yloxy)-benzophenone, melting at about 49–51° centigrade.

*Analysis.*—Calculated for $C_{18}H_{18}O_3$: C, 76.60; H, 6.43. Found: C, 76.65; H, 6.44.

To a refluxing suspension of eight grams (0.205 mole) of sodium amide in 200 milliliters of diethyl ether is added a solution of 11.4 grams (0.1 mole) of phenylacetonitrile in 200 milliliters of diethyl ether over a two-hour period. The reaction mixture is refluxed for one additional hour, at the end of which time the ammonia evolution has practically ceased. With stirring, a solution of 28 grams (0.1 mole) of 4-(tetrahydropyran-2-yloxy)benzophenone in 100 milliliters of diethyl ether is added. After two additional hours reflux, the reaction mixture is kept at room temperature for sixteen hours and the excess sodium amide cautiously decomposed with water. The organic layer is washed several times with water, dried over anhydrous magnesium sulfate, filtered and the solvent removed under reduced pressure. The residual oil is dissolved in methanol from which white crystals of 2,3-diphenyl-3-[4-(tetrahydropyran-2-yloxy)phenyl]acrylonitrile separate, melting over a range from 118°–144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 82.15; H, 6.25; N, 3.87.

These crystals are dissolved in 100 milliliters of boiling glacial acetic acid containing three drops of concentrated sulfuric acid and slowly diluted with water until yellow needles separate (about 250 milliliters of water is needed). 2,3-diphenyl-3-(4-hydroxyphenyl)acrylonitrile is obtained as yellowish crystals melting at about 207–208° centigrade.

By the procedure described in Preparation 1, a mixture of 2,3-diphenyl-3-(4-hydroxyphenyl)acrylonitrile and sodium hydroxide in isoamyl alcohol is refluxed for about three hours, cooled, and the product filtered, converted to the phenol by acidification, and recrystallized, to give 2,3-diphenyl-3-(4-hydroxyphenyl)acrylamide.

Preparation 6.—3-(4-hydroxyphenyl)-2-(4-methoxyphenyl)-3-phenylacrylamide

By the preparation described in Preparation 5, 4-(tetrahydropyran-2-yloxy)benzophenone is allowed to react with 4-methoxyphenylacetonitrile to give 3-(4-hydroxyphenyl)-2-(4-methoxyphenyl)-3-phenylacrylonitrile, yellowish crystals when crystallized from acetic acid, melting at about 189–191° centigrade.

*Analysis.*—Calculated for $C_{22}H_{17}NO_2$: C, 80.73; H, 5.24; N, 4.28. Found: C, 80.10; H, 5.32; N, 4.46.

By the procedure described in Preparation 1, a mixture of 3-(4-hydroxyphenyl)-2-(4-methoxyphenyl)-3-phenylacrylonitrile and sodium hydroxide in isoamyl alcohol is refluxed for about three hours, cooled, and the product filtered, converted to the phenol by acidification, and recrystallized, to give 3-(4-hydroxyphenyl)-2-(4-methoxyphenyl)-3-phenylacrylamide.

Preparation 7.—2-(4-chlorophenyl)-3-(4-hydroxyphenyl)-3-phenylacrylamide

By the procedure described in Preparation 5, 4-(tetrahydropyran-2-yloxy)-benzophenone is allowed to react with 4-chlorophenylacetonitrile. The ether is removed and the reaction mixture is extracted with hexane from which a crop of crystals separate. These are recrystallized from ethanol to give one of the geometric forms of 2-(4-chlorophenyl)-3-phenyl-3-[4-(ltetrahydropyran - 2 - yloxy)phenyl]-acrylonitrile, melting at about 183–184° centigrade.

Analysis.—Calculated for $C_{26}H_{22}ClNO_2$: C, 75.10; H, 5.33; N, 3.37. Found: C, 75.00; H, 5.42; N, 3.43.

The oily residue from the above hexane mother liquor and the crystals of tetrahydropyranyl derivative are treated separately in glacial acetic acid to give the two geometric forms of 2-(4-chlorophenyl) - 3 - (4-hydroxyphenyl)-3-phenylacrylonitrile, melting at about 175–177° and 187–189° centigrade, respectively.

Analysis.—Calculated for $C_{21}H_{14}ClNO$: C, 76.03; H, 4.25; N, 4.22. Found, respectively: C, 76.18, 76.07; H, 4.29, 4.62; N, 4.11, 4.12.

By the procedure described in Preparation 1, a mixture of 2-(4-chlorophenyl)-3-(4-hydroxyphenyl) - 3 - phenylacrylonitrile and sodium hydroxide in isoamyl alcohol is refluxed for about three hours, cooled, and the product filtered, converted to the phenol by acidification, and recrystallized, to give 2-(4-chlorophenyl)-3-(4-hydroxyphenyl)-3-phenylacrylamide.

Preparation 8.—3,3-bis(4-dimethylaminophenyl)-2-(4-hydroxyphenyl)acrylamide

By the procedure described in Preparation 3, 4,4'-bis-(dimethylamino)benzophenone is allowed to react with 4-(tetrahydropyran-2-yloxy)phenylacetonitrile to give 3,3-bis(4-dimethylaminophenyl) - 2 - [4-(tetrahydropyran-2-yloxy)phenyl]acrylonitrile, yellow crystals when crystallized from dimethylformamide-ethanol (1:20), melting at about 189–191° centigrade.

Analysis.—Calculated for $C_{30}H_{33}N_3O_2$: C, 77.05; H, 7.11; N, 8.99. Found: C, 76.82; H, 7.23; N, 8.88.

The tetrahydropyranyl derivative dissolved in dimethylformamide is decomposed with excess 30 percent sulfuric acid and, upon neutralization with diethylamine, orange crystals of 3,3-bis(4-dimethylaminophenyl) - 2 - (4-hydroxyphenol)acrylonitrile are obtained, melting at about 240–242° centigrade.

Analysis.—Calculated for $C_{25}H_{25}N_3O$: C, 78.29; H, 6.57; N, 10.95. Found: C, 77.80; H, 6.76; N, 10.78.

By the procedure described in Preparation 1, a mixture of 3,3-bis(4-dimethylaminophenyl)-2-(4-hydroxyphenyl) acrylonitrile and sodium hydroxide in isoamyl alcohol is refluxed for about three hours, cooled, and the product filtered, converted to the phenol by acidification, and recrystallized, to give 3,3-bis(4-dimethylaminophenyl)-2-(4-hydroxyphenyl)acrylamide.

Preparation 9.—2,3-bis(4-hydroxyphenyl)-3-phenylacrylamide

By the procedure described in Preparation 5, 4-(tetrahydropyran-2-yloxy)benzophenone is allowed to react with 4-(tetrahydropyran-2-yloxy)phenyl acetonitrile. The ether is removed and the reaction mixture is dissolved in ethanol, from which a crop of crystals separate. These are recrystallized from dimethylformamide to give one of the geometric forms of 3-phenyl-2,3-bis[4-(tetrahydropyran-2-yloxy)phenyl]-acrylonitrile, melting at about 189–191° centigrade.

Analysis.—Calculated for $C_{31}H_{31}NO_4$: C, 77.31; H, 6.49; N, 2.91. Found: C, 76.75; H, 6.63; N, 3.28.

The oily residue from the above ethanol mother liquor and the crystals of the tetrahydropyranyl derivative are treated separately in glacial acetic acid to give the two geometric forms of 2,3-bis(4-hydroxyphenyl)-3-phenylacrylonitrile, melting at about 263–264° and 261–262° centigrade, respectively.

Analysis.—Calculated for $C_{21}H_{15}NO_2$: C, 80.51; H, 4.83; N, 4.47. Found, respectively: C, 80.20, 80.56; H, 4.96, 4.98; N, 4.31, 4.22.

By the procedure described in Preparation 1, a mixture of 2,3-bis(4-hydroxyphenyl) - 3 - phenylacrylonitrile and sodium hydroxide in isoamyl alcohol is refluxed for about three hours, cooled and the product filtered, converted to the phenol by acidification, and recrystallized, to give 2,3-bis(4-hydroxyphenyl)-3-phenylacrylamide.

Preparation 10.—2,3-diphenyl-3-(2-hydroxyphenyl) acrylamide

Using 2-hydroxybenzophenone in place of 4-hydroxybenzophenone in the procedure of Preparation 5, 2,3-diphenyl-3-(2-hydroxyphenyl)acrylonitrile is obtained as yellow crystals.

By the procedure described in Preparation 1, a mixture of 2,3-diphenyl-3-(2-hydroxyphenyl)acrylonitrile and sodium hydroxide in isoamyl alcohol is refluxed for about three hours, cooled, and the product filtered, converted to the phenol by acidification, and recrystallized, to give 2,3-diphenyl-3-(2-hydroxyphenyl)acrylamide.

Preparation 11.—2-(4-hydroxyphenyl)-3,3-bis(4-trifluoromethylphenyl) acrylamide

By the procedure described in Preparation 1, 4,4'-bis(trifluoromethyl)benzophenone is allowed to react with 4-methoxyphenylacetonitrile to give 2-(4-methoxyphenyl)-3,3-bis-(4-trifluoromethylphenyl)acrylonitrile.

By treating 2-(4-methoxyphenyl)-3,3-bis(4-trifluoromethylphenyl)acrylonitrile with pyridine hydrochloride according to the procedure of Preparation 1, 2-(4-hydroxyphenyl) - 3,3-bis(4 - trifluoromethyl)acrylonitrile is obtained.

By the procedure described in Preparation 1, a mixture of 2 - (4-hydroxyphenyl)-3,3-bis(4 - trifluoromethylphenyl)acrylonitrile and sodium hydroxide in isoamyl alcohol is refluxed for about three hours, cooled, and the product filtered, converted to the phenol by acidification, and recrystallized, to give 2-(4-hydroxyphenyl)-3,3-bis(4 - trifluoromethylphenyl)acrylamide.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover when one dilower-alkylamino group, such as the dimethylamino group, is present in a compound, other dilower-alkylamino compounds are prepared in the same manner starting only with the selected different diloweralkylamino compound. In the same manner, ortho and meta substituted compounds are produced instead of the para by utilizing the selected ortho or meta substituted starting compound. Similarly, other molecular changes are readily made.

The following examples are given by way of illustration only and are not to be construed as limiting.

Example 1.—N-methyl 4-(1-carbamoyl-2,2-diphenylvinylphenyl carbamate

Ten grams (0.032 mole) of 3,3-diphenyl-2-(4-hydroxyphenyl)acrylamide is dissolved in 100 milliters of dry benzene which contains about ten milliliters of dimethyl formamide and about five drops of pyridine. The solution is cooled in an ice bath and 2.5 grams (0.044 mole) of methyl isocyanate in twenty milliliters of dry benzene is added over a twenty-minute period with stirring. The solution is allowed to come to room temperature and remain there for about sixteen hours. The solvents are removed under reduced pressure and the residue is taken up in a minimum of hot benzene. N-methyl 4-(1-carbamolyl-2,2-diphenylvinyl)phenyl carbamate is obtained as white needles melting at about 234–235° centigrade.

*Analysis.*—Calculated for $C_{23}H_{20}N_2O_3$: C, 74.20; H, 5.41; N, 7.52. Found: C, 74.13; H, 5.60; N, 7.39.

Example 2.—N-methyl 4-[1-carbamoyl-2,2-bis(4-tolyl)vinyl]phenyl carbamate

By the procedure of Example 1, 2-(4-hydroxyphenyl)-3,3-bis(4-tolyl)acrylamide is allowed to react with methyl isocyanate to give N-methyl 4-[1-carbamoyl-2,2-bis(4-tolyl)vinyl]phenyl carbamate.

Example 3.—N-methyl 4-[1-carbamoyl-2,2-bis(4-chlorophenyl)vinyl]phenyl carbamate By the procedure of Example 1, 3,3-bis(4-chlorophenyl)-2-(4-hydroxyphenyl)acrylamide is allowed to react with methyl isocyanate to give N-methyl 4-[1-carbamoyl-2,2-bis(4-chlorophenyl)vinyl]phenyl carbamate.

Example 4.—N-methyl 4-[1-carbamoyl-2,2-bis(4-methoxyphenyl)vinyl]phenyl carbamate By the procedure of Example 1, 2-(4-hydroxyphenyl)-3,3-bis(4-methoxyphenyl)acrylamide is allowed to react with methyl isocyanate to give N-methyl 4-[1-carbamoyl-2,2-bis(4-methoxyphenyl)vinyl]phenyl carbamate.

Example 5.—N-methyl 4-[1-carbamoyl-2,2-bis(4-dimethylaminophenyl)vinyl]phenyl carbamate By the procedure of Example 1, 3,3-bis(4-dimethylaminophenyl)-2-(4-hydroxyphenyl)acrylamide is allowed to react with methyl isocyanate to give N-methyl 4-[1-carbamoyl-2,2-bis(4 - dimethylaminophenyl)vinyl]phenyl carbamate.

Example 6.—N-propyl 4-(1-carbamoyl-2,2-diphenylvinyl)-phenyl carbamate

By the procedure of Example 1, 3,3-diphenyl-2-(4-hydroxyphenyl)acrylamide is allowed to react with propyl isocyanate to give N-propyl 4-(1-carbamoyl-2,2-diphenylvinyl)phenyl carbamate.

Example 7.—4-(1-carbamoyl-2,2-diphenylvinyl)phenyl carbanilate

By the procedure of Example 1, 3,3-diphenyl-2-(4-hydroxyphenyl)acrylamide is allowed to react with phenyl isocyanate to give 4-(1-carbamoyl-2,2-diphenylvinyl)phenyl carbanilate.

Example 8.—4-(1-carbamoyl-2,2-diphenylvinyl)phenyl carbamate

A solution of 3,3-diphenyl-2-(4-hydroxyphenyl) acrylamide in dimethylformamide is treated with a molar equivalent of sodium methoxide and allowed to react with chloroformamide to give 4-(1-carbamoyl-2,2-diphenylvinyl)phenyl carbamate.

Example 9.—N,N-dimethyl-4-(1-carbamoyl-2,2-diphenylvinyl)phenyl carbamate

A solution of 3,3-diphenyl-2-(4-hydroxyphenyl)-acrylamide in dimethylformamide is treated with a molar equivalent of sodium methoxide and then allowed to react with dimethylcarbamoyl chloride to give N,N-dimethyl-4-(1-carbamoyl-2,2 - diphenylvinyl)phenyl carbamate.

Example 10.—N-methyl 4-(2-carbamoyl-1,2-diphenylvinyl)phenyl carbamate

By the procedure of Example 1, 2,3-diphenyl-3-(4-hydroxyphenyl)acrylamide is allowed to react with methyl isocyanate to give N-methyl 4-(2-carbamoyl-1,2-diphenylvinyl)phenyl carbamate.

Example 11.—N-methyl 4-[2-carbamoyl-2-(4-methoxyphenyl)-1-phenylvinyl]phenyl carbamate By the procedure of Example 1, 3-(4-hydroxyphenyl)-2-(4-methoxyphenyl)-3-phenylacrylamide is allowed to react with methyl isocyanate to give N-methyl 4-[2-carbamoyl-2-(4-methoxyphenyl) - 1-phenylvinyl]phenyl carbamate.

Example 12.—N-methyl 4-[2-carbamoyl-2-(4-chlorophenyl)-1-phenylvinyl]phenyl carbamate By the procedure of Example 1, 2-(4-chlorophenyl)-3-(4-hydroxyphenyl)-3-phenylacrylamide is allowed to react with methyl isocyanate to give N-methyl 4-[2-carbamoyl-2-(4-chlorophenyl)-1 - phenylvinyl]phenyl carbamate.

Example 13.—2,3-bis[4-(N-methylcarbamoyloxy)phenyl]-3-phenylacrylamide

By the procedure described in Example 1, fifteen parts of 2,3-bis(4-hydroxyphenyl)-3-phenylacrylamide is allowed to react with six parts of methyl isocyanate to give 2,3-bis[4-(N - methylcarbamoyloxy)phenyl]-3 - phenylacrylamide.

Example 14.—N-methyl 2-(2-carbamoyl-1,2-diphenylvinyl)phenyl carbamate

By the procedure of Example 1, 2,3-diphenyl-3-(2-hydroxyphenyl)acrylamide is allowed to react with methyl isocyanate to give N-methyl 2-(2-carbamoyl-1,2-diphenylvinyl)phenyl carbamate.

Example 15.—N-methyl 4-[1-carbamoyl-2,2-bis(4-trifluoromethylphenyl)vinyl]phenyl carbamate By the procedure of Example 1, 2-(4-hydroxyphenyl)-3,3-bis(4-trifluoromethylphenyl)acrylamide is allowed to react with methyl isocyanate to give N-methyl 4-[1-carbamoyl-2,2-bis(4-trifluoromethylphenyl)vinyl]phenyl carbamate.

Although in this example both R and R', as designated in the formulae above, are trifluoromethyl, compounds wherein only one, or any other combination of two of R, R' and R" are trifluoromethyl, are produced from the corresponding hydroxy-containing starting material.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec-butyl, t-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, buccally, intramuscularly, and intraperitoneally.

Pharmaceutical formulations are usually prepared from a predetermined quantity of one or more of the compounds of the invention, preferably in solid form. Such formulations may take the form of powders, elixirs, solutions, pills, capsules, pellets, or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired. Broader ranges appear to be one to 500 milligrams per unit dose. The active agents of the invention may be combined for administration with other pharmacologically active agents, such as analgesics, sedatives, tranquilizers, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established principles.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

We claim:

1. A triarylacrylamide urethane having the formula:

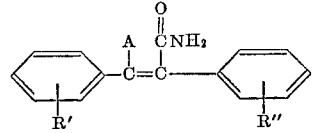

wherein R' and R" are independently selected from the group consisting of hydrogen, lower-alkyl, lower-alkoxy, halogen, trifluoromethyl, dilower-alkylamino, hydroxy, and carbamoyloxy of the formula —OCONR'''R''', in which the two R''' groups are independently selected from the group consisting of hydrogen, lower-alkyl, and phenyl, at least one of R' and R" being carbamoyloxy, and wherein A has the formula

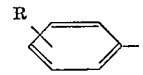

in which R is selected from the group consisting of hydrogen, lower-alkyl, lower-alkoxy, halogen, trifluoromethyl, and dilower-alkylamino.

2. N - lower - alkyl (1 - carbamoyl - 2,2-diphenylvinyl)phenyl carbamate.
3. N - lower - alkyl (2 - carbamoyl - 1,2-diphenylvinyl)phenyl carbamate.
4. N - methyl 4 - (1 - carbamoyl - 2,2 - diphenylvinyl) phenyl carbamate.
5. N - methyl 4 - (2 - carbamoyl - 1,2 - diphenylvinyl) phenyl carbamate.
6. N - methyl 4 - [1 - carbamoyl - 2,2 - bis(4 - chlorophenyl)vinyl]-phenyl carbamate.
7. N - methyl 4-[1 - carbamoyl - 2,2 - bis(4 - methoxyphenyl)-vinyl]phenyl carbamate.
8. N - methyl 4 - [1 - carbamoyl - 2,2 - bis(4 - dimethylaminophenyl)-vinyl]phenyl carbamate.
9. N - propyl 4 - (1 - carbamoyl - 2,2 - diphenylvinyl) phenyl carbamate.
10. 4 - (1 - carbamoyl - 2,2 - diphenylvinyl)phenyl carbamate.
11. N,N - dimethyl - 4 - (1 - carbamoyl - 2,2-diphenylvinyl)phenyl carbamate.
12. N - methyl 4 - [2 - carbamoyl - 2 - (4-methoxyphenyl)-1-phenylvinyl]phenyl carbamate.
13. N - methyl 4 - [2 - carbamoyl - 2-4-chlorophenyl)-1-phenylvinyl]phenyl carbamate.
14. 2,3 - bis[4 - (N-methylcarbamoyloxy)phenyl]-3-phenylacrylamide.
15. N - methyl 2 - (2 - carbamoyl - 1,2 - diphenylvinyl) phenyl carbamate.

References Cited

Hoi et al.; Chem. Abstracts, vol. 41, column 619.
Cove et al.; Chem. Abstracts, vol. 41, column 4137.

LORRAINE A. WEINBERGER, *Primary Examiner.*

M. WEBSTER, *Assistant Examiner.*

UNITED STATES PATENT OFFICE
CERTIFICATE OF CORRECTION

Patent No. 3,378,579            April 16, 1968

Robert Edward Allen et al.

It is certified that error appears in the above identified patent and that said Letters Patent are hereby corrected as shown below:

Column 2, line 54, "$R''''$" should read -- $R'''$ --. Column 9, line 2, "vinylphenyl" should read -- vinyl)phenyl --. Column 12, line 48, "2-4-chlorophenyl)" should read -- 2-(4-chlorophenyl) --.

Signed and sealed this 12th day of August 1969.

(SEAL)
Attest:

Edward M. Fletcher, Jr.            WILLIAM E. SCHUYLER, JR.
Attesting Officer            Commissioner of Patents